Oct. 14, 1952 E. J. THURBER 2,613,549
POWER TRANSMISSION MECHANISM
Filed June 12, 1945 5 Sheets-Sheet 1
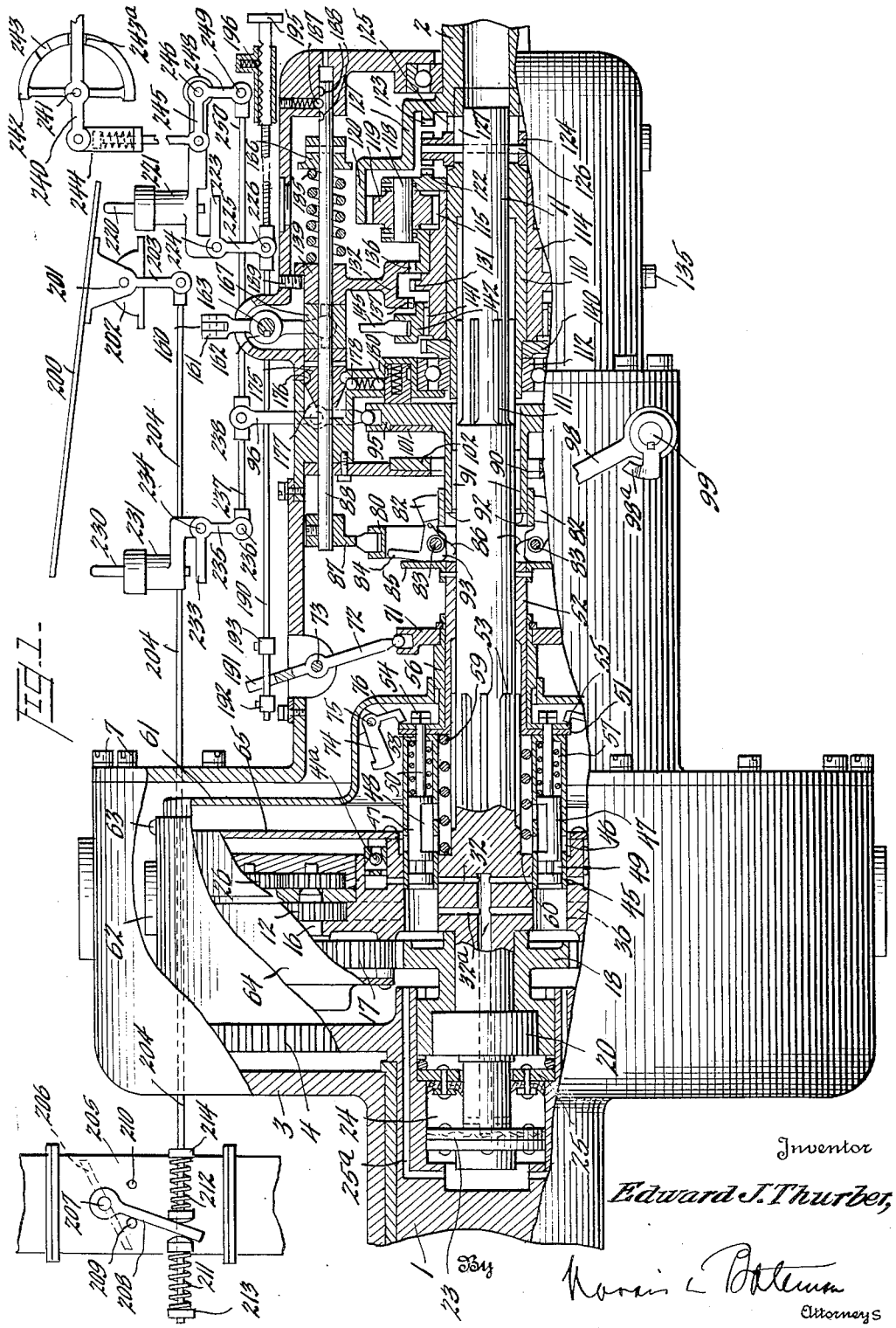
Inventor
Edward J. Thurber,
By
Morris L. Bateman
Attorneys

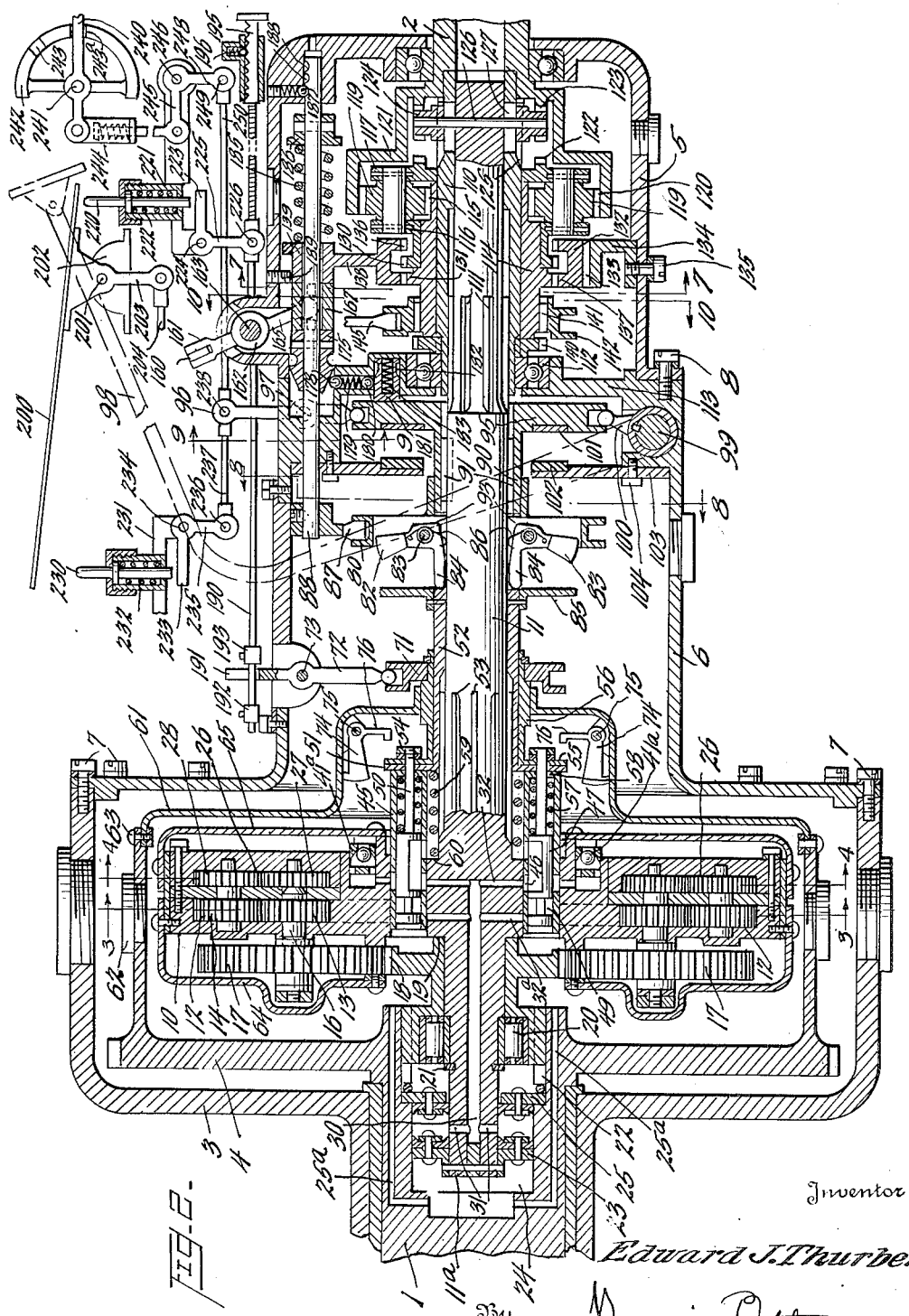

Oct. 14, 1952     E. J. THURBER     2,613,549
POWER TRANSMISSION MECHANISM
Filed June 12, 1945     5 Sheets-Sheet 3
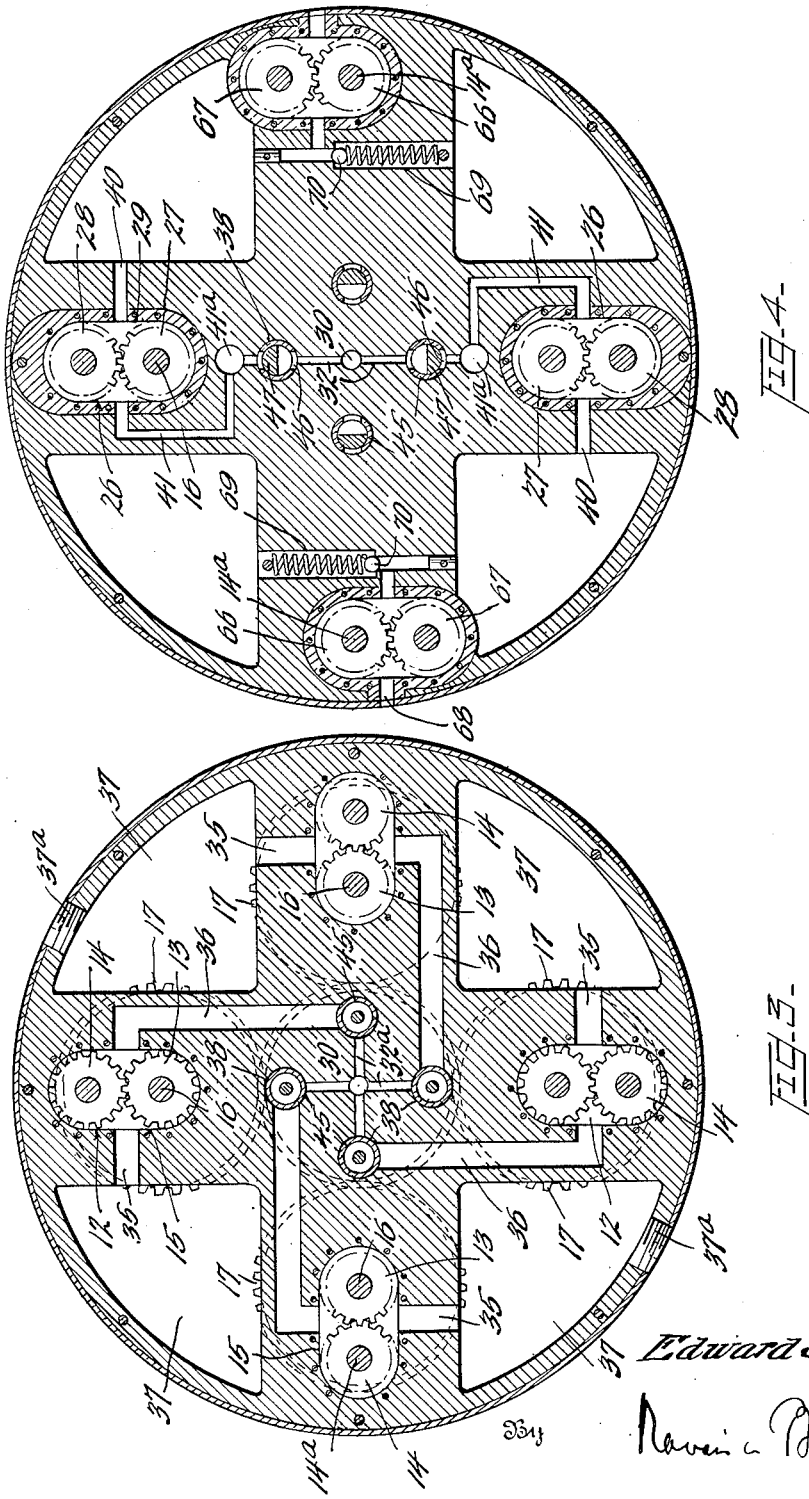
Inventor
Edward J. Thurber
By
Attorneys Oct. 14, 1952 E. J. THURBER 2,613,549
POWER TRANSMISSION MECHANISM
Filed June 12, 1945 5 Sheets-Sheet 4
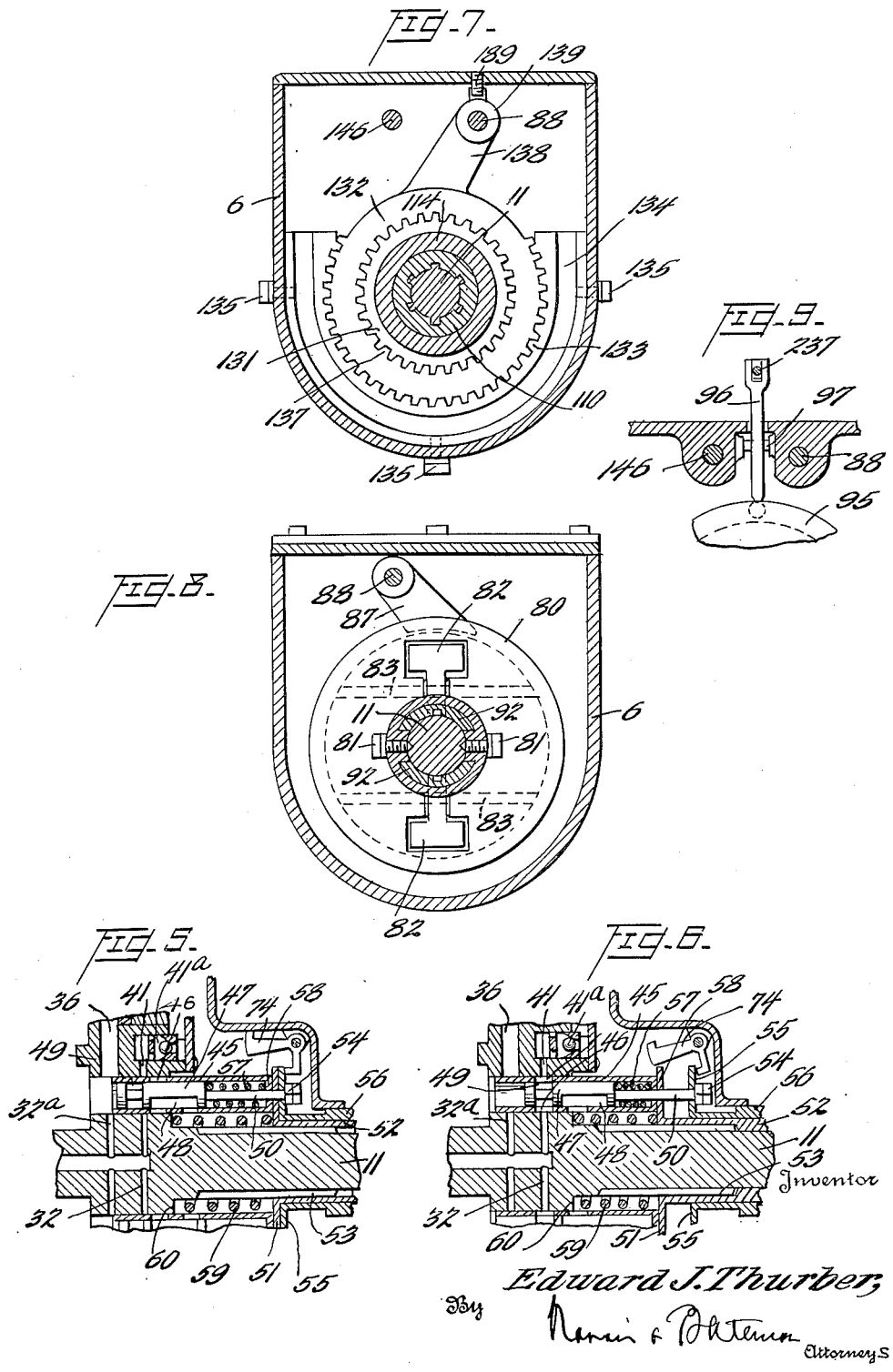

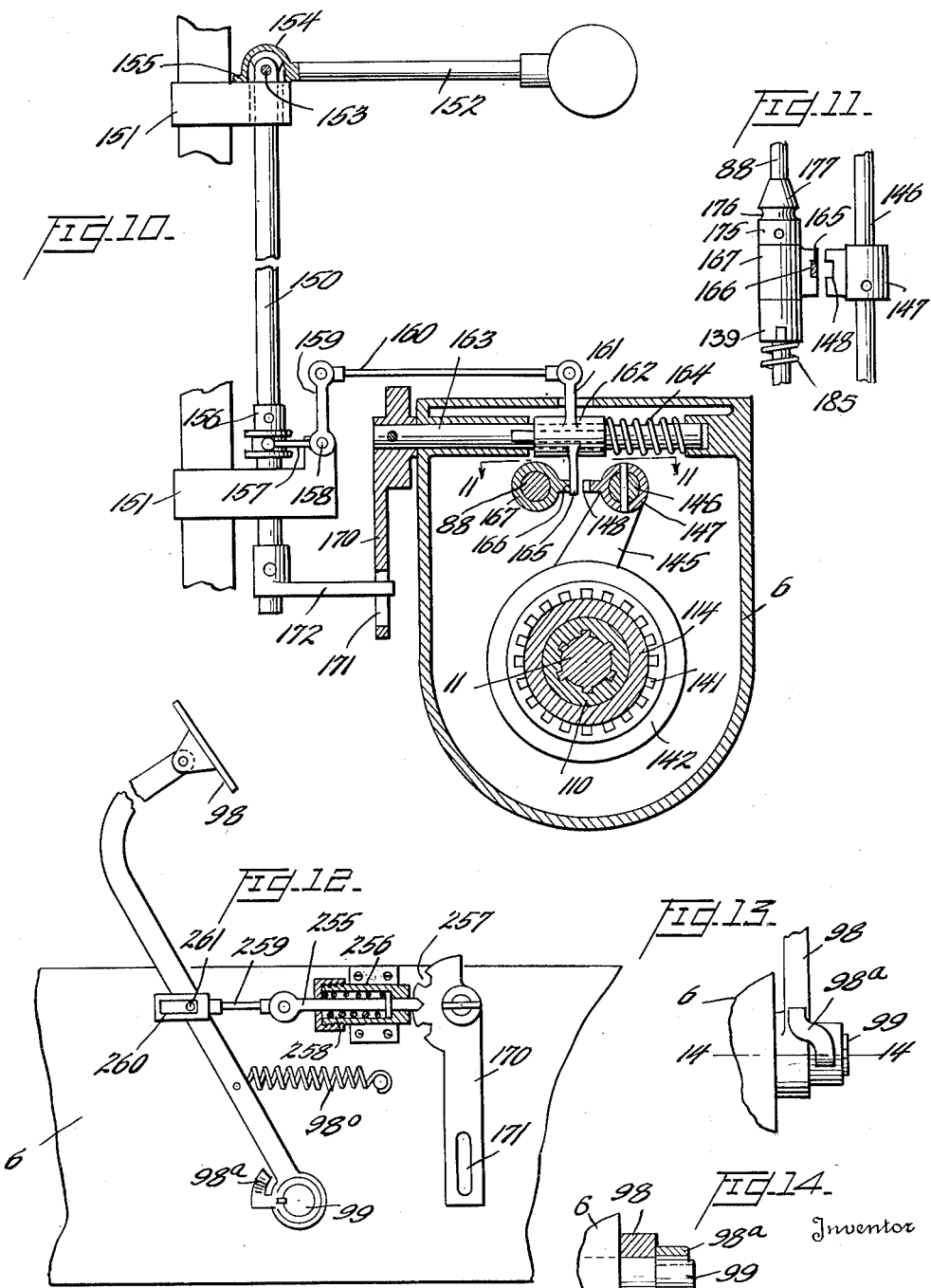

Patented Oct. 14, 1952

2,613,549

UNITED STATES PATENT OFFICE 2,613,549

POWER TRANSMISSION MECHANISM

Edward J. Thurber, New Orleans, La., assignor to The Thurber Corporation, New Orleans, La., a corporation of Louisiana Application June 12, 1945, Serial No. 599,101

61 Claims. (Cl. 74—472)

The present invention relates to improvements in power transmissions adapted to be employed for starting and controlling the operation of machines or mechanisms generally, and is especially applicable to the power transmissions of automobiles, motor boats and other automotive vehicles for providing a variable torque and ratio of speed transmission from an engine or other driving element to the driven means or other driven element.

One of the primary objects of the invention is to provide a novel and improved power transmission which is capable of transmitting torque through a range of speed which may be varied infinitely from zero up to direct drive from the driving to the driven element, and producing an overdrive in which the driven element operates at a higher speed than that of the driving element.

Another object is to provide a novel and improved power transmission whereby power may be transmitted through an infinite variation of speed from zero up to direct drive between the driving and driven elements, or to drive the driven element at a higher speed than that of the driving element, or to drive the driven element in a reverse direction relatively to that of the driving element.

Another object is to provide novel control means for power transmissions for controlling the operation thereof automatically, semi-automatically or manually.

A further object of the invention is to provide a novel transmission gearing of the planetary type which embodies means whereby it may operate to transmit power directly between its driving and driven members, or in a relatively reverse direction and at a reduced speed from the driving to the driven member, and which also provides an overdrive in which the driven member is driven at a higher speed than that of the driving member.

A further object of the invention is to produce an improved power transmission mechanism which provides two speed ranges, and which enables the speed in one of the ranges to be varied infinitely from zero up to direct drive and the speed in the other range to be varied infinitely from zero up to a speed higher than direct drive, independently of the speed of the engine or driving shaft.

A further object of the invention is to provide a novel single planetary gear set having a single ring gear and providing a plurality of forward gear ranges, a reverse and a neutral condition.

A further object of the invention is to provide a hydraulic power transmission mechanism comprising a casing containing fluid and means for circulating the fluid in the casing for transmitting torque from a driving shaft to a driven shaft, and means for maintaining a sufficient supply of fluid in said casing for the hydraulic transmission of power.

A further object of the invention is to provide a hydraulic power transmission mechanism in which circulating fluid transmits torque from a driving to a driven shaft at infinitely varying speed ratios from zero to direct drive, and wherein the fluid circulation is stopped when the driving and driven shafts reach the same speed of rotation.

A further object of the invention is to provide a hydraulic power transmission mechanism with circulating fluid to transmit torque from a driving shaft to a driven shaft at infinitely varying speed ratios from zero to direct drive, such hydraulic power transmission operating in conjunction with a gear set having a plurality of forward gear ranges, a reverse and a neutral condition, and means operable by fluid pressure or by manual means for selectively effecting a gear range change in the gear set.

To these and other ends, the invention consists in certain improvements and combinations and arrangements of parts, all as will be hereinafter described, the features of novelty being pointed out more particularly in the claims at the end of this specification.

In the accompanying drawings—

Figure 1 is an elevation, partly in longitudinal section, of a power transmission embodying the present invention, the various parts being shown in their normal positions while the transmission is in neutral and not in operation.

Figure 2 is a longitudinal section of the transmission, showing the relative positions of the parts while the transmission is in operation and is set for direct drive or overdrive.

Figure 3 is a vertical section of the rotor, taken on the line 3—3 in Fig. 2.

Figure 4 is a vertical section of the rotor, taken on the line 4—4 in Fig. 2.

Figures 5 and 6 are detail views of one of the rotor controlling valve units, showing the same in different operative positions.

Figure 7 is a transverse section taken on the line 7—7 in Fig. 2.

Figure 8 is a section taken on the line 8—8 in Fig. 2.

Figure 9 is a detail section taken on the line 9—9 in Fig. 2.

Figure 10 is an elevation of the steering column control means, a portion of the transmission being shown in transverse section taken on the line 10—10 in Fig. 2.

Figure 11 is a detail horizontal section taken on the line 11—11 in Fig. 10.

Figure 12 is a side elevation, showing the intercontrol between the master control pedal and the transmission setting means.

Figure 13 is a detail view showing the mounting of the master control pedal and the transmission setting shaft.

Figure 14 is a detail section taken on the line 14—14 in Fig. 13.

Similar parts are designated by the same reference characters in the several views.

Although the invention is applicable generally to power transmissions adapted to be employed for various purposes, it is shown applied in the present instance to a transmission which is particularly adapted for use in automobiles, motor boats and other automotive vehicles, in which the driving element 1 may be the crank shaft of the internal combustion engine which drives the vehicle, and the driven element 2 may be the tail or propeller shaft which drives the wheels or other means which propels the vehicle. It is to be understood that the drawings are for the purpose of illustration, and are not to be taken as limitative of the invention, reference being had to the appended claims as determinative of the scope of the invention.

The improved transmission comprises preferably a casing which encloses its various operating parts and is suitably mounted in fixed position in the vehicle, this casing including a section 3 of a suitable size and shape to house the engine fly-wheel 4, a gear-box section 5 to house the gearing, and an intermediate section 6 which is interposed between and securely fixed to the sections 3 and 5 as by screws 7 and 8 respectively.

The transmission mechanism preferably embodies a hydraulic torque transmitting unit which is similar to those disclosed in my prior application Ser. No. 574,096 filed January 23, 1945, now Patent No. 2,490,720, granted Dec. 6, 1949, and application Ser. No. 589,180 filed April 19, 1945, with, however, some modifications. This unit as shown in the present instance comprises a rotor 10 which is integral with or otherwise suitably fixed to a shaft 11 and carries a suitable number of torque transmitting pumps 12 which are preferably of the gear type, four of these pumps being preferably employed which are spaced symmetrically or 90 degrees apart around the axis of the rotor. Each of these pumps as shown comprises a pair of gears 13 and 14 which mesh with one another and operate in a pump chamber 15 formed in the rotor, the pump gear 13 having a driving shaft 16 which extends to the exterior of the rotor and has a gear 17 fixed thereon, the gears 17 of all of these pumps meshing with a central gear 18 which is mounted rotatably on the shaft 11. The hub of the gear 18 abuts at one end against a thrust shoulder 19 on the shaft 11, and the other end of the hub of this gear is chambered and has a roller bearing 20 mounted therein, the outer race of this bearing being pressed into said chamber and the inner race thereof being mounted on the shaft 11 and abutting against a thrust ring 21 inserted in a circumferential groove in said shaft. The gear 18 is thus confined between the thrust shoulder 19 and ring 21 from axial movement relatively to the shaft 11 and is constrained to move axially with said shaft, as will hereinafter appear. The hub of the gear 18 is splined to cooperate with splines 22 formed within the adjacent end of the driving shaft 1, so that the gear 18 will be driven by rotation of the shaft 1 although capable of shifting axially thereof.

Means is provided for shifting the shaft 11 axially by fluid pressure for which purpose a piston 23 is fixed to the reduced end 11a of said shaft and operates in a cylinder 24 formed in the adjacent end of the shaft 1, the outer end of the cylinder being closed by a head 25 which is fixed to the end of the cylinder and through which the reduced end of the shaft 11 extends, and the inner end of the cylinder being in free communication with the chamber within the fly-wheel through passages 25a. The piston and cylinder head may be provided with suitable packing, as shown. The rotor also carries a suitable number of reversion pumps 26 which are preferably of the gear type, a pair of these pumps being shown in the present instance which are located diametrically of the rotor, each of these pumps comprising gears 27 and 28 which are mounted rotatably in pump chambers 29 formed in the rotor, the gear 27 of each of the pumps being fixed to the shaft 16 of the respective pump 12 to rotate therewith. The shaft 11 is provided with an axial passage 30 having radial ports 31 which communicate with the cylinder 24 between the piston 23 and cylinder head 25, and with radial ports 32 and 32a.

Each of the torque transmitting pumps 12 is provided with a fluid inlet 35 and a fluid outlet 36, the inlets of these pumps communicating with chambers 37 formed within the rotor, which may be provided with removable plugs 37a for initially charging the rotor with oil, and the outlets of these pumps extending inwardly to valve chambers 38 which are located near the center of the rotor. Each of the reversion pumps is provided with a passage 40 which communicates with one of the chambers 37, and with a passage 41 which communicates with one of the valve chambers 38.

Each of the valve chambers 38 contains a valve sleeve 45 which is fitted slidably therein and the inner end of which controls the discharge of fluid from the outlets 36 of the pumps 12 through the respective valve chamber and the open inner end thereof to return to the oil chamber or reservoir of the rotor. The valve sleeves for the pumps 12 each contain a valve member 47, and the valve sleeves are each provided with diametrally disposed ports 46 therein to control respectively the passage 41 of the respective reversion pump and port 32 in the shaft 11, and two of the valve members 47 which are associated with the reversion pumps each has a longitudinal port 48 adapted, when this valve member occupies an appropriate position, to provide a vent or exhaust from the respective port 32 and cylinder 24, and has a transverse port 49 therein adapted to establish communication between the respective passage 41 and port 32 through the ports 46 in the respective valve sleeve 45 when shifted to an appropriate position. The inner valve members are provided with stems 50 which extend movably through a flange 51 of a sleeve 52, the latter being internally splined to cooperate with splines 53 on the shaft 11 whereby this sleeve may be shifted axially of said shaft but will rotate therewith, and the ends of the valve stems 50 are provided with locked nuts 54 or other suitable enlargements which bear against the flange 55 of a sleeve 56 which is mounted for movement axially on the sleeve 52. Pre-loaded springs 57 are interposed between the inner valve members and the closed ends 58 of the respective valve sleeves 45, these springs biassing the inner valve members into the position shown in Figs. 1 and 2 relatively to the respective valve sleeves to normally interrupt communication between the reversion pump passages 41 and the respective ports 32, and venting the latter port and the cylinder 24. A preloaded spring 59, which is stronger than the combined strength of the springs 57, which may be relatively light, is interposed between the sleeve 52 and a shoulder 60 on the shaft 11 and acts to move the sleeve 52 in a direction to move the valve sleeves 45 into a position to uncover the pump outlet ports 36, as shown in Fig. 1, and to normally but yieldingly retain it in such position.

While the shaft 11 occupies the neutral position and the valve sleeves 45 are in position to open the pump outlet ports 36, as shown in Fig. 1, the outlet passages 36 of the torque transmitting pumps are unobstructed by the valve sleeves so that these pumps operate idly or without transmitting appreciable torque between the driving shaft and the rotor. The reversion pumps, which operate simultaneously with the torque transmitting pumps, have their passages 41 closed under these conditions by the valve sleeves 45, but development of vacuum in these passages is prevented by check valves 41a inserted in said passages and which admit fluid thereto but close to prevent escape of fluid therefrom when pressure is developed in these passages, as will be hereinafter explained.

The rotor is enclosed partially by the fly-wheel within which it is preferably mounted, and by a casing section 61 which is fixed to the fly-wheel to rotate therewith as by the screws 63, thus providing an oil reservoir which surrounds the rotor which may be filled and drained by removing the plugs 62. The pump driving gears and the sides of the rotor are enclosed by a pair of casing sections 64 and 65 which form an annular oil reservoir from which the rotor pumps draw in the fluid and circulate it in and through the rotor and then discharge the fluid back into this reservoir.

A suitable number of scavenging pumps are preferably provided for drawing oil or operating fluid from the outer reservoir within the fly-wheel into the annular oil chamber of the rotor, a pair of these scavenging pumps being shown in the present instance (Fig. 4) each of which is of the gear type comprising a pair of gears 66 and 67, the former driven from the shaft 14a of the respective pump gear 14. Each scavenging pump has an inlet 68 leading thereto from the exterior periphery of the rotor, and a discharge 69 leading to the interior oil chamber of the rotor. During normal operation, these scavenging pumps will operate to draw oil or operating fluid from the fly-wheel reservoir into the rotor, but in order to prevent reverse flow of oil through the pumps, as when their direction of rotation is reversed, each discharge passage 69 is provided with a spring-pressed check valve 70 to prevent such return flow.

The sleeve 56 extends slidably and rotatably through a bearing in the central portion of the casing section 61 and is provided with a grooved collar 71 for shifting it axially, this collar cooperating with the inner end of a lever 72 which is pivoted at 73 to the transmission casing and extends to the exterior thereof for cooperation with control means, to be hereinafter described. The sleeve 56 also cooperates with a starting governor which is responsive to the speed of the driving shaft comprising a suitable number of centrifugally controlled governor members which in the present instance are in the form of weights 74 pivoted at 75 within the casing section 61 and having arms 76 arranged to cooperate with the flange 55 on the sleeve 56. While the engine or driving shaft is not in operation, these governor members will be engaged by the flange 55 under the action of the spring 59 and held retracted thereby, as shown in Fig. 1, but since the governor members travel in a circular path during rotation of the driving shaft, they will be caused by centrifugal force to operate on the sleeve 56 shifting the latter in a direction to cause movement of the valve sleeves 45 toward a position to close the pump outlet ports 36.

The sleeve 52 is controlled by a master governor which is responsive to the speed of the shaft 11, or of an automobile, for example, driven therefrom, and this sleeve is also controllable manually. For these purposes a collar 80 is provided which is fixed to the shaft 11, as by screws 81, this collar carrying a suitable number of centrifugally controlled governor weights 82 which are pivoted in the collar on pivot pins 83, these governor weights having arms 84 arranged to cooperate with the face of a flange 85 fixed to the adjacent end of the sleeve 52. Springs 86 are provided which act to retract the governor weights toward their inner position, as shown in Fig. 1, and to hold them in such position. These springs are yieldable to permit the governor wieghts to swing outwardly under centrifugal force when the shaft 11 reaches a predetermined speed of rotation, the arms 84 then acting on the flange 85 to move the sleeve 52 in a direction to move the valve sleeves 45 into position to close the pump outlet ports 36. The collar 80 is also controllable manually by an arm 87 which cooperates with a groove in its periphery, this arm being fixed to a shaft 88.

Means is also provided for over-riding the master governor, such means, as shown in the present instance, comprising a sleeve 90 which is splined on the shaft 11 by keys 91 so that it may shift axially on said shaft but rotate therewith, this sleeve having fingers 92 thereon which, when the sleeve 90 is shifted toward the master governor, will engage the heel portions 93 of the governor weights and swing the latter inwardly or toward retracted position against the action of centrifugal force acting on the governor weights, thus retracting the arms 84 and permitting the sleeve 52 to recede under the action of the spring 59, thus causing the valve sleeves 45 to move toward a position to open the pump outlet ports 36. The sleeve 90 is controlled by a collar 95 which is fixed thereto and may be operated manually by either an arm 96 pivoted at 97 in the transmission casing and having its inner end engaging in a peripheral groove in this collar, or by a master pedal 98, mounted rotatably on a shaft 99 and adapted to abut against a lug 98a keyed thereon, this shaft being in the transmission casing and having an arm 100 fixed thereon and engaging in the peripheral groove in said collar. Preferably, the collar 95 is provided with a friction ring 101 which is engageable with a friction ring 102 when said collar is shifted to its full extent, or substantially so, the friction ring 102 being mounted on a disk 103 fixed, as by screws 104, within the transmission casing, and serving to stop spinning of the shaft 11 and the rotor thereon. The master pedal is normally held in its retracted position by a spring 98° which is preferably relatively strong.

The gearing provided by the present invention for connecting the rotor shaft 11 to the driven shaft for direct or overdrive, or for reverse, comprises a sleeve or hollow shaft 110 having splines therein which cooperate with splines 111 formed on the shaft 11 whereby the latter rotates the shaft 110 and is slidable axially therein. The shaft 110 is supported at one end by a bearing 112 mounted in a wall 113 of the transmission casing which serves as a partition to divide the gear containing portion of the casing from the remainder thereof, and the other end of the shaft 110 is supported by journaling it in the adjacent end of the shaft 2. A sleeve 114 is mounted rotatably on the shaft 110, this sleeve having a sun gear 115 formed thereon or otherwise fixed thereto, and having a planetary gear carrier also mounted rotatably thereon, comprising a pair of annular side members 116 and 117 connected by a suitable number of pinion shafts 118, and planetary pinions 119 are journaled on these shafts and mesh at their inner sides with the sun gear 115. These pinions mesh at their outer sides with the teeth 120 of an internal gear 121 which is formed integrally with or otherwise fixed to the driven shaft 2. The member 117 of the planetary pinion carrier is provided with a jaw clutch member 122, and the gear 121 is provided with a similar jaw clutch 123 which is opposite thereto and spaced therefrom, and a controlling clutch member 124 is interposed between the clutch members 122 and 123 and has complemental clutch teeth on its opposite sides to engage the teeth of one or the other of the opposed clutch members when the clutch member 124 is shifted axially in one or the other direction, the controlling clutch member, while in an intermediate position, being disengaged from both of the opposed clutch members, and being then in neutral position, as shown in Fig. 1. The controlling clutch member is splined to engage splines 125 on the shaft 110 which provide a driving connection between said clutch member and shaft but permit axial movement of this clutch member to engage and disengage it with respect to the opposed clutch members. The clutch member 124 is controlled by axial shifting movements of the shaft 11 and it serves to connect this shaft to the driven shaft 2 either directly or through the planetary gear carrier, it being connected to the shaft 11 by a pin 126 which extends therethrough and through diametrically opposite slots 127 in the shaft 110 and is connected at its outer ends to said clutch member.

The member 116 of the planetary pinion carrier is formed with a circular jaw brake member 130, and the sleeve 114 is provided with a similar companion brake member 131, and these brake members are adapted to cooperate with a surrounding controlling brake member 132 which is mounted for movement axially but it is firmly held from rotating, this brake member 132 being preferably in the form of a ring having splines 133 extending axially on its periphery and slidably engaging complemental splines formed in a segmental anchor member 134 which is suitably fixed in the transmission casing, as by screws 135. The brake member 132 is formed internally with two sets of brake teeth 136 and 137 which are respectively complemental to the teeth of the brake members 130 and 131, and are spaced apart axially to a sufficient extent to enable one or the other of the sets of teeth to engage the respective brake member 130 or 131 while the other set of teeth is disengaged from the other of said brake members. While the member 132 occupies one of its positions in which its teeth 136 engage the brake member 130, the pinion carrier will be locked from rotation, and while the member 132 occupies its other position in which its teeth 137 engage the brake member 131, the sun gear 115 will be locked from rotation. The controlling brake member 132 is shifted axially by an operating arm 138 which is connected to a collar 139 mounted slidably on the shaft 88.

The shaft 110 is splined exteriorly to receive a circular toothed clutch member 140, the sleeve 114 is provided with a circular set of clutch teeth 141 which correspond in diameter, shape and number to the clutch teeth on the clutch member 140, and an axially shiftable controlling clutch member 142 is provided having a set of internal clutch teeth which are complemented to the clutch teeth on the clutch member 140 and the sleeve 114 and are of sufficient axial length to simultaneously engage the clutch teeth on the clutch member 140 and those on the sleeve 114 when the clutch member 142 is moved axially into a position for reverse drive, thereby clutching together the shaft 110 and sleeve 114, and to uncouple these parts when moved axially into its other position for direct or overdrive.

The controlling clutch member 142 is shifted by an arm or fork 145 which is pinned or otherwise fixed to a rail 146 slidably mounted in the transmission casing, the hub 147 of this fork having a recess 148 therein for a purpose hereinafter described.

Manually controlled means is provided for setting the transmission for direct, overdrive, reverse and neutral, such control means being located within convenient reach of the operator, and when the transmission is applied to an automobile, being located preferably on the steering column thereof. Such setting means, as shown in the present instance, comprises a shaft 150 which is mounted rotatably and slidably in suitable bearing brackets 151 secured to the steering column of an automobile, the upper end of this shaft having a lever 152 pivotally connected thereto by a pivot pin 153 which extends transversely of the axis of said shaft whereby to and fro swinging movements of the lever will rotate said shaft in one or the other direction. The portion of the lever adjacent to the shaft is formed with a cap 154 which overlies the upper end of the shaft and is adapted to normally rest on the top of the upper bracket 151, and this cap is formed with a lip 155 which, when the outer end of the lever 152 is swung upwardly, will bear as a fulcrum on the top of said bracket and thereby cause the shaft 150 to be shifted upwardly. The shaft 150 has a grooved collar 156 pinned or otherwise fixed thereon, and an arm 157 of a bell-crank lever cooperates with this collar, the bell-crank lever being pivoted at 158 to the lower bracket 151 and having its other arm 159 pivotally connected to a rod 160. This rod is connected to the upper arm 161 of a lever 162 having a sleeve thereon which is splined on a shaft 163 to rotate therewith but to slide axially thereon. The shaft 163 is mounted rotatably in the transmission casing and has a spring 164 thereon which acts on the lever 162 in a direction to yieldingly hold the hand lever 152 in its normal lower position. The lower arm 165 of the lever 162 is adapted to engage in the recess 148 in the hub 147 of the fork 145 when said lever is shifted on the shaft 163 against the action of the spring 164 by lifting the hand lever 152, but said spring normally holds the lever arm 165 out of said recess and in engagement with a recess 166 in a collar 167, the latter being mounted slidably on the shaft 88.

Rotation of the shaft 163 will cause the lever 162 to reciprocate one or the other of the collars 147 and 167, according to the one engaged by said lever under control of the hand lever 152. The shaft is rotated by a lever 170 which is pinned or otherwise fixed thereto exteriorly of the transmission casing, this lever having a slot 171 therein in which engages the end of a lever 172 pinned or otherwise fixed to the shaft 150. Rotation of the shaft 150 will therefore swing the lever 172 thereon, and said lever will swing the lever 170 and thereby rock the shaft 163 according to the direction in which the hand lever is swung.

The collar 167 on the shaft 88 is interposed between the collar 139 of the brake controlling member 132 thereon and a cam 175 which is pinned or otherwise fixed on said shaft. This cam is formed with a recess 176 and with an inclined or tapered portion 177 which leads to recess 176, and a ball 178 is pressed by a spring 179 against the cam and rides thereon when the cam is shifted axially by endwise movement of the shaft 88. The power of the spring 179 is sufficient to move the cam 175 to the right when the ball 178 engages with the tapered portion 177, or to urge the cam 175 to the left when the ball 178 enters the recess 176, and the power of the spring 179 is controlled by another ball 180 on which it bears, and by a cam 181 having therein a recess 182 with an inclined surface, this cam being mounted in a recess in the wall 113 to slide in a direction parallel to the axis of the shaft 11, and being yieldably pressed toward the adjacent face of the collar 95 by a spring 183.

The collars 139 and 167 on the shaft 88 are yieldingly pressed against one another and against the cam 175 by a spring 185 one end of which abuts against the collar 139, the other end of this spring abutting and reacting against a collar 186 which is pinned or otherwise fixed on said shaft. A spring-pressed detent 187 is arranged to engage in one or another of a series of suitably located recesses 188 in the shaft 88 to yieldingly retain it in different set positions corresponding with neutral, and direct and overdrive. A stop pin 189 is provided for limiting the movement of the collar 139 under the action of the spring 185.

In the embodiment of the invention shown in Figs. 1 and 2, the lever 72 for manually controlling the valve adjusting sleeve 56 is operated by a rod 190 which extends loosely through an opening 191 in its upper end, this rod having a pair of collars 192 and 193 adjustably secured thereon to engage one or the other side of this lever when the rod is reciprocated in one or the other direction, these collars being spaced apart sufficiently to permit free movement of this lever in response to the operation of the governor weights 74. The rod 190 is provided with a knob 195 which may be located at a remote point within convenient reach of the operator for operation by hand, a detent 196 being provided for retaining it in any desired set position. The rod 190 is also provided with means for operating it by the fuel control element of the engine driving the transmission, such as the usual accelerator pedal of an automobile, as shown in the present instance, wherein the accelerator pedal 200 is pivoted at a point between its toe and heel ends, as at 201, on a suitable support 202 and has an arm 203 pivotally connected to a rod 204 which controls the throttle of the carburetor of the engine. A portion 205 of the carburetor is shown, the throttle 206 of which is connected by its shaft 207 to the usual throttle lever 208, stops 209 and 210 being arranged to be engaged by the throttle lever when the throttle is fully closed and fully opened, respectively. Springs 211 and 212 are interposed between the respective sides of the throttle lever and collars 213 and 214 fixed at suitable points on the rod 204 for operating the throttle lever and for permitting the rod to move beyond fully closed or fully open throttle position.

A plunger 220 is mounted beneath the heel end of the accelerator pedal in a position to be depressed when said pedal is rocked beyond its fully closed throttle position, this plunger being guided to reciprocate vertically in a suitable stationary bracket 221 and being normally held yieldingly in its raised or inactive position by a spring 222. The lower end of this plunger is arranged to engage and depress an arm 223 of a bell-crank lever which is pivoted at 224 on said bracket, and the other arm 225 of the bell-crank lever is pivotally connected to the rod 190 at 226. When the rear or heel end of the accelerator pedal is depressed beyond fully closed throttle position, it depresses the plunger 220 and the latter depresses the arm 223 of the bell-crank lever, the latter moving the rod 190 to bring its collar 193 against the lever 72 and to swing the latter in a direction to shift the sleeve 56 in a direction to move the valve sleeves 45 toward a position to open the pump outlet port 36.

It is to be understood that the collar 193 may be adjusted along the rod 190 and secured in different positions thereon to permit different settings for the operation of the valve sleeves 45. For example, it may be desired to move the valve sleeves 45 toward a position to open the pump outlet ports 36 when the throttle reaches closed position, and such an operation may be provided for by setting the collar 193 in an appropriate position along the rod 190.

Means is provided for over-riding the master governor and permit opening of the valve sleeves 45 under control of the accelerator pedal, such means comprising a plunger 230 located beneath the forward or toe end of the accelerator pedal in a position to be depressed thereby when said pedal is depressed beyond fully open throttle position, said plunger being mounted for vertical movement in a relatively fixed bracket 231, and being normally held yieldingly in its elevated or inactive position by a spring 232. The lower end of this plunger is arranged to engage and depress the arm 233 of a bell crank lever which is pivoted to the bracket 231 at 234, the other arm 235 of this bell crank lever being pivotally connected at 236 to a rod 237, and the latter being pivotally connected at 238 to the upper end of the lever 96 which cooperates with the collar 95.

Hand controlled means remote from the transmission is also preferably provided for operating the lever 96 to shift the collar 95, such means comprising in the present instance a hand lever 240 which is pivoted at 241 on a sector 242 supported in any desired stationary position, this lever being adapted to engage in a notch 243 or 243a in the sector to set the transmission for direct, overdrive and neutral positions. The lever 240 is connected through a yieldable or spring coupling like 244, to an arm 245 of a bell crank lever which is pivoted at 246 to the stationary supporting bracket 221, the other arm 248 of this bell crank lever being pivotally connected at 249 to a rod 250 which is pivotally connected at 238 to the lever 96.

When it is desired to retain the valves 45 in open position and to retain the clutch member 124 in neutral position as shown in Fig. 1, the setting lever 240 is placed beyond the notch 243 in the sector 242, thus shifting the collar 95 to the left of its position as shown in Figs. 1 and 2. The fingers 92 on sleeve 90 attached to the collar 95 will all be shifted thereby to the left and the fingers 92 will engage the heel portions 93 of the governor weights 82 and swing them inwardly or toward a retracted position and thus hold the governor immobilized. With the governor weights 82 held in retracted position as shown in Fig. 1, the valves 45 will be held in their open position by spring 59, thus neutralizing the rotor 10, as shown in Fig. 1. When the collar 95 was moved to the left as just described, it moved away from the cam 181, permitting spring 183 to move the cam 181 to the left until the ball 180 registered with the recess 182, thus relieving the spring pressure on the ball 178, and with the spring pressure thus relieved from the ball 178, the cam 175 and rail 88 are no longer influenced by these elements and the clutch member 124 can be shifted to a neutral position and retained in such position by spring-pressed ball 187 on rail 88 and by the plunger 255 operated by the pedal 98 as shown in Fig. 12.

Means is preferably provided for controlling the setting of the transmission and locking thereof in different set position, by the master pedal 98. Such means as shown in Fig. 12, comprises a plunger 255 which is mounted slidably in a bracket 256 secured to the outer side of the transmission casing in a position to engage at one end in one or another of a set of notches 257, formed in the lever 170 located concentrically of its axis, and corresponding in number and spacing to the different positions, such as neutral, and direct and reverse drive, in which the lever 162 may be set. This plunger is yieldingly held in the notch in which it engages by a spring 258, thereby locking the lever 162 against operation, but is retracted to release said lever for operation by a rod 259 connected thereto and to a slotted link 260 with which a pin 261 on the master pedal 98 cooperates. The slot in said link is preferably elongated sufficiently to enable the master pedal to operate the collar 95 to an extent to open the rotor valves and engage the brake rings 101 and 102 before the pin 261 picks up the link 260 and retracts the plunger, thereby stopping rotation of the gearing and clutch members and avoiding clashing thereof and facilitating the desired changes in the setting of the transmission.

When the master pedal 98 is operated while the controlling clutch member 124 is engaged with the pinion carrier clutch member 122 or with the ring gear clutch member 123, it will first open the control valves 45, thus placing the transmission in a neutral condition, and also coincidentally engage the brake members 101 and 102 which will retard or lock the driven shaft 2 from rotation, thus effectively applying a brake to the motor vehicle.

The operation of a transmission as shown in the present embodiment, assuming it is being used in an automobile, is as follows:

A supply of oil or other suitable operating fluid is initially placed either directly in the rotor chambers 37 by removing one of the filler plugs 37a, or is placed in the chamber formed by the fly-wheel and casing section 61, as by removing one of the plugs 62, the oil thus supplied being in an amount sufficient to supply the intakes of the pumps while the rotor is revolving. Upon starting of the engine, the fly-wheel revolves, and the pump driving gear 18 driven from the engine or driving shaft 1 rotates the gears 17, thereby setting into operation the torque transmitting pumps 12 and the reversion pumps 27, 28 and the scavenging pumps 66, 67. If the supply of oil is initialy placed in the fly-wheel chamber, this oil is thrown by centrifugal force against the periphery thereof, and operation of the scavenging pumps causes them to pick up this oil and deliver it to the reservoir chamber in the rotor formed by the casing sections 64 and 65. When a sufficient amount of the oil has been thus introduced into the rotor reservoir chamber to reach the intakes 35 of the torque transmitting pumps, and the engine is run slowly, these pumps commence to circulate the oil, discharging it from these pumps through their outlets into the respective valve chambers 38 and back into the rotor reservoir, and as the engine is running at relatively low speed during this operation, the circulating oil discharges freely from the open inner ends of the valve chambers and will be thrown by centrifugal force to the periphery of the rotor reservoir for recirculation by the torque transmitting pumps.

When the engine speed reaches a predetermined value above idling speed, the starting governor weights 74 will swing outwardly by centrifugal force and will move the valve members 45 and 47 from their normal position shown in Fig. 1 to partially close the pump outlet ports 36, as shown in Fig. 5, but such will not prevent such circulation of the oil, and the torque transmitting pumps do not have a capacity sufficient to move the automobile if it is in gear. The torque transmitted under these conditions is sufficient, however, to cause the rotor 10, while it is free of any load, to spin. In order to stop such spinning, the accelerator pedal may be rocked rearwardly, thereby causing its rear or heel end to depress the plunger 220 and, through its connections thereto, to actuate the lever 72 in a direction to fully retract the valve sleeves 45 against the action of the starting governor weights 74. The discharge passages 36 of the torque transmitting pumps are then free or fully open so that no torque is transmitted, and spinning of the rotor is stopped. The clutch members of the gearing are then stationary, or substantially so, and the transmission is in condition to be set for direct forward drive of the automobile.

Normally, the transmission setting shaft 163 is locked against operation by the plunger 255 (Fig. 12) so that the first operation, in setting the transmission, is to depress the master pedal 98 to retract said plunger, the selecting lever 152 being thereby unlocked for operation. In order to set the transmission for direct forward drive, the hand lever, while it occupies its normal lower level shown in Fig. 10 and the lever 162 engages the fork or recess 166 in the collar 167, is swung in a direction to shift the collar 167 to the right from its neutral position shown in Fig. 1 to the position shown in Fig. 2. Such movement of this collar causes the collar 139 of the brake member 132, against which it abuts, to also shift to the right into the position shown in Fig. 2, thereby disengaging the teeth 136 from the teeth 130 on the planetary pinion carrier member 116 and engaging the teeth 137 on the brake member 132 with the teeth 131 on the sleeve 114, this sleeve at this time being free on the shaft 110 since the clutch member 142 is engaged with only the clutch teeth 141 on said sleeve. Movement of the collar 139 to the position shown in Fig. 2 also loads the spring 125, causing it to shift the shaft 88 from the position shown in Fig. 1 to that shown in Fig. 2, thereby causing the arm or fork 87 engaging in the groove in the collar 80 fixed to the shaft 11 to shift this shaft from its neutral position shown in Fig. 1 to the position shown in Fig. 2, and engaging the clutch member 124 with the clutch teeth 123 on the driven shaft 2. A direct driving connection is thus established between the shaft 2 and the shaft 11. The master pedal 98 may be returned to its normal position after setting the transmission for direct drive, thereby permitting the plunger 255 to lock the transmission for such drive.

After the transmission has been thus set, the accelerator pedal may be rocked forwardly, allowing the plunger 220 to return to its normal elevated position and freeing the lever 72 so that the sleeve 56 may respond to the influence of the starting governor weights 74, and also increasing the speed of the engine by opening the throttle thereof. Increase of engine speed will increase the speed of rotation of the torque transmitting pumps 13, 14, and in consequence, the volume of oil passing through their discharge passages 36 which are partially closed by the valve sleeves 45, and as the speed of the engine is further increased by further depression of the accelerator pedal, the torque applied to the rotor builds up until it reaches a value sufficient to rotate the shaft 11 and to start the automobile into motion.

As the speed of the automobile increases, the weights 82 of the master governor, which is driven by the shaft 11 and therefore responds to the speed of the automobile, swing outwardly by centrifugal force, causing the arms 84 connected to these governor weights to swing inwardly and, bearing against the flange 85, to shift this flange and the sleeve 52 connected thereto from the position shown in Fig. 1 toward that shown in Fig. 2, thereby moving the valve sleeves 45 toward a position to close the ports 36, and eventually to fully close such ports when the speed of the automobile reaches a predetermined speed, such for example, as 35 miles per hour. When such a speed has been reached, and the valve sleeves are in fully operated position, the discharge passages 36 of the torque transmitting pumps are fully closed, thereby stopping the circulation of the fluid and producing a hydraulic lock which blocks operation of the torque transmitting pumps, causing the rotor and the driven shaft to rotate with and at the same speed as the driving shaft 1. The speed of the automobile may then be controlled at the will of the operator by operation of the accelerator pedal, the hydraulic rotor then providing a direct drive between the engine and the shaft 2 which may be connected to the driving wheels of the automobile in the conventional manner.

Should the operator desire acceleration of the speed of the automobile beyond the power of the engine while the latter is still in direct drive, as in passing another automobile or climbing a hill, such can be accomplished, while the lever 240 is in a position between the notches 243 and 243a of the sector 242, by pressing the accelerator pedal forwardly beyond its fully open throttle position, thereby causing its toe end to depress the plunger 230. Depression of this plunger causes the lever 96 to rock in a direction to shift the sleeve 90 toward the left from the position shown in Fig. 2, thereby causing the fingers 92 on this sleeve to engage the master governor weights 82 at the angles adjacent to their pivots and to swing these weights inwardly toward retracted position in counteraction to the centrifugal force acting thereon, and the consequent retraction of the arms 84 allows the flange 85 and the sleeve 52 connected thereto to recede toward the right under the action of the spring 59, thus permitting the valve sleeves 45 to move to partially open the pump outlet ports 36. The consequent reduction in pressure of the oil in the discharge passages of the torque transmitting pumps allows the engine to increase its speed relatively to that of the rotor so that the engine develops its maximum torque and thereby develops an increase in the torque transmitted through the rotor and to apply its power more effectively to the driving of the automobile, producing a result similar to that obtained by shifting a conventional transmission to a lower gear. The extent to which the rotor control valve sleeves are thus operated may be varied by pressing the accelerator pedal to different extents beyond fully open throttle position. If the engine is about to stall due to overload, the accelerator pedal may be pressed to its full extent beyond fully open throttle position, thereby causing the sleeve 90 to fully over-ride the master governor and allow the spring 59 to move the valve sleeves 45 toward a position to open the ports 36 until such movement is stopped by the governor 74, thereby relieving the engine of its load. By allowing the toe end of the accelerator pedal and the plunger 230 to rise gradually, the master governor is permitted to resume its control of the valve sleeves 45, due to retraction of the governor controlling sleeve 90, until the desired driving condition has been obtained. It will be understood that throughout the operations of over-riding the master governor and controlling the extent of operation of the valve sleeves 45 to open the ports 36 by pressing the accelerator pedal beyond its fully open throttle position, the engine throttle is in its fully open position.

If it is desired to control manually the torque and ratio of speed transmission through the rotor while the transmission is set for direct drive, such may be accomplished by shifting the collar 95 to its extreme left-hand position from that shown in Fig. 2 by operation of the remote control hand lever 240 and locking it in the notch 243 of the sector 242, thereby completely blocking the master governor and relieving the valve sleeves 45 entirely of the controlling influence thereof. The sleeve valves 45 may then be operated entirely manually by manipulating the hand knob 195 located at a suitable remote point, this hand knob serving to operate the lever 72 which is connected to the valve sleeves through the inner valve members 47 and springs 57, and to thereby control manually the extent of movement of the valve sleeves 45 in a direction to open the ports 36 and, consequently, the amount of torque transmitted through the rotor. While the hand control knob 195 is not being used, the hand lever 240 may be locked in the notch 243a of the sector, and while so locked it will not interfere with the operation of the master governor controlling sleeve 90 by the accelerator pedal actuated plunger 230 since the force available to depress this plunger is sufficient to cause the resilient coupling link 244 to stretch while the hand lever 240 is locked in the notch 243a.

Assuming the transmission is set for direct drive and the automobile is being driven at a predetermined speed, as for example, above 35 miles per hour, as assumed in Fig. 2, and it is desired to shift into overdrive whereby the driven shaft 2 will rotate at a higher speed than that of the engine or driving shaft 1, the transmission may be conditioned for overdrive by simply setting the lever 240 in engagement with the notch 243a in the sector, as shown in this figure, thereby placing the collar 95 in its extreme right hand position, as shown. While this collar is in such position, the fingers 92 on the sleeve 90 are entirely out of the range of movement of the weights 82 of the master governor, thus allowing these weights to swing beyond the range necessary to advance the rotor control valve sleeves 45 to close pump discharge passages 36 and to bring the arms 84 of this governor inwardly sufficiently to act as a lock to hold said valve sleeves in position to fully close the passages 36. Movement of the collar 95 to its extreme right hand position also presses the cam 181 toward the right and into the position shown in Fig. 2, thereby causing it to act on the ball 180 to increase the loading of the spring 179 and causing the ball 178 to act on the inclined surface 177 on the cam 175 with a pressure sufficient to move the rail 88 to and hold it in its right hand position, as shown in Fig. 2. Movement of the rail 88 to the position for direct drive, as shown in Fig. 2 conditioned the gearing for overdrive by shifting the brake member 132 to disengage its teeth 136 from the teeth 130 on the member 116 of the planetary pinion carrier and to engage its teeth 137 with the teeth 131 on the sleeve 114 to which the sun gear 115 is fixed.

With the transmission conditioned as just described, and the automobile traveling at a relatively high speed, closing of the engine throttle, as by allowing the accelerator pedal to return toward or to closed throttle position, produces a reversion torque between the engine and the automobile, the momentum of the automobile, in effect, driving the engine at a speed higher than that corresponding with the setting of the engine throttle. The effect of this reversion torque is to reverse the direction of rotation of the pump driving gears 17, and of the torque transmitting pumps 13, 14, and of the reversion pumps 27, 28. The passages 41 of the reversion pumps, which during normal operation, are the inlets to these pumps, then become the discharge passages thereof, and as the outlets of these passages are closed by the inner valve members 47 which lap the ports 46 in the respective valve sleeves 45, pressure of oil is built up in said discharge passages which, in effect, directly connects the driving and driven shafts. This fluid pressure and the associated shifting elements operated thereby are utilized to effect power shift from direct drive to overdrive, at the will of the operator, by rocking the accelerator pedal rearwardly to cause its heel end to depress the plunger 220. Such actuation of this plunger actuates the rod 190 and lever 72 to retract the sleeve 56. Since the sleeve 52 connected to the valve sleeves 45 is locked at this time by the arms 84 of the master governor, it cannot move the valve sleeves in a direction to open the ports 36 and the ports 46 in these sleeves remain in communication with the respective passages 41 of the reversion pumps and the radial ports 32 in the shaft 11, but the sleeve 56 which is connected to the inner valve members 47 will retract these members, which will be permitted by compression of the springs 57, bringing the ports 49 in the inner valve members into communication with the reversion pump discharge passages 41 and the radial ports 32 in the shaft 11, as shown in Fig. 6, thus establishing a flow of oil delivered under pressure from the reversion pumps in the cylinder 24 between its head 25 and the piston 23. The result thereof is to shift the shaft 11 axially toward the left from the position shown in Fig. 2, thereby disengaging the clutch member 124 from the direct drive clutch teeth 123 on the driven shaft 2 and engaging the clutch member 124 with the clutch teeth 122 on the pinion carrier of the planetary gearing, thereby coupling the rotor shaft 11 through the planetary gearing to the driven shaft 2. Although this shift of the shaft 11 is effected almost immediately, there is a moment during which no torque will be transmitted, due to the drop in pressure of the oil delivered by the reversion pumps incident to the flow of oil therefrom into the cylinder 24, but after the piston 23 has made its full stroke and connected the clutch member 124 to the clutch teeth 122 on the pinion carrier to establish the overdrive connection between the rotor shaft 11 and the driven shaft 2, the pressure of the oil delivered by the reversion pumps will again build up. When, at the will of the operator, the accelerator pedal is moved forwardly or to throttle opening position, the inner valve members 45 are permitted to return to their normal positions under the action of their springs 57, thus bringing their ports 48 into communication with the radial ports 32 in the shaft 11 and with the chamber containing the spring 59, for exhausting oil from the space in the cylinder between its head 25 and the piston 23 to said spring chamber from which it may escape and return by centrifugal force to the oil reservoir in the rotor.

During the shift of the rotor shaft into position for overdrive, the collar 80 fixed thereto operates through the arm or fork 87 to shift the rail 88 to the left from the position shown in Fig. 2 until the recess 176 in the cam 175 fixed to said rail approaches registration with the ball 178, whereupon said ball snaps into said recess by action of the spring 179, thus moving the rail 88 to and locking it in overdrive position. Although, during the shift from direct drive to overdrive, the gear shifting lever 152 remains set in direct drive position, and the shaft 163 is locked in such position by the plunger 259, the setting of the rail 88 in overdrive position is not thereby interfered with since during such shift of the rail 88 it moves freely through the collars 139 and 167 which are mounted loosely on this rail, and the spring 185 yields and is compressed by the shift of the rail 88 and the collar 186 thereon. Such compression of the spring 185 stores the power therein for the shift back to direct drive.

While the transmission is set for overdrive, the drive will be from the rotor shaft to the clutch member 124 and from the latter, through the clutch teeth 122, to the planetary pinion carrier. Since the sun gear, in this setting, is locked from rotation by engagement of the anchored brake member 132 with the teeth 131 on the sun gear carrying sleeve 114, rotation imparted to the planetary pinion carrier will cause the planetary pinions to the driven in a circular path around the sun gear, as the latter is held from rotation, the rotating pinions traveling in such circular path, will drive the internal gear 120 engaging their outer peripheries at a speed greater than the speed of rotation of the rotor shaft and in the same direction therewith, the ratio of overdrive depending on the relative diameters of the sun gear and internal gear.

Whenever the operator desires to shift back to direct drive, as for example, to increase the rate of acceleration of the automobile or its hill climbing ability, such may be accomplished by depressing the accelerator pedal forwardly beyond its fully open throttle position. Such operation of the accelerator pedal causes its toe end to depress the plunger 230 which, acting through the rod 237 and lever 96, shifts the collar 95 and sleeve 90 abruptly to the left from the position shown in Fig. 2. This operation causes the fingers 92 on the sleeve 90 to engage the weights 82 of the master governor and to swing these weights inwardly toward retracted position and to swing the arms 84 of this governor outwardly away from the flange 85, thereby permitting the spring 59 to move the valve sleeves 45 to fully open the ports 36 and thereby relieve all torque through the rotor. Such movement of the collar 95 also allows the spring 183 to retract the cam 181 and thereby bring its recess 182 into register with the ball 180, thus allowing this ball to recede and reduce the loading of the spring 179. Since the spring 185 was compressed or loaded by the shift of the shaft 11 to overdrive position, and is held in such loaded condition by the collar 80 and the arm or fork 87 engaging it, the spring 185, acting on the collar 186, will have sufficient power to overcome the restraining action of the spring 179 and permit dislodgement of the ball from the recess 176, and to restore the rail 88 to its former or direct drive position, as shown in Fig. 2, causing the shaft 11 to which it is connected by the arm 87 and collar 80, to shift back to the position shown in Fig. 2, thereby disengaging the clutch member 124 from the clutch teeth 122 on the pinion carrier and engaging it with the clutch teeth 123 on the shaft 2. During the return of the shaft 11 to direct drive position, the spring 59 is overcome by the superior power of the compressed spring 185, and as the shaft 11 shifts to its direct drive position, oil in the cylinder 24 between its head 25 and the piston 23 is exhausted therefrom through the passage 30 and ports 31 and 32, and through the then open ports 46 in the sleeves 45 and ports 48 in valve members 47 and enables the oil to vent to the interior of the reservoir provided by the casing section 61. This shift from overdrive to direct drive will take place very rapidly, and although during this operation, the engine throttle is fully open, the transmission of torque through the rotor will be interrupted since the valve sleeves 45 will be in position to fully open the ports 36, but as soon as this operation is completed, and the accelerator pedal is allowed to return to fully open throttle position and thereby permit the plunger 230 to return to its normally elevated position, and thus free the master governor for operation to move the valve sleeves 45 to position to close the ports 36, the torque through the rotor will be restored, and acceleration of the automobile may then be accomplished.

In order to set the transmission for reverse drive from direct drive, the master control pedal 98 is depressed, thereby retracting the plunger 255 and unlocking the shaft 163, and the shift lever 152 is brought to neutral position thereby rotating shaft 163 and causing the lever 162 thereon, acting on the collar 167, to shift this collar to the left from the position shown in Fig. 2 to the position shown in Fig. 1. Such movement of the collar 167 causes it to act on the cam 175 fixed to the rail 88 to shift this rail to the neutral position shown in Fig. 1. The collar 139 of the overdrive and reverse setting brake member 132 follows the collar 167 in its movement to neutral position until it reaches the stop 189, whereupon its movement is arrested, thus positioning the brake member 132 so that its teeth 136 are engaged with the teeth 130 on the member 116 of the pinion carrier, thereby locking the pinion carrier from rotation, and the teeth 137 on the brake member 132 are disengaged from the teeth 131 on the sleeve 114 to which the sun gear 115 is fixed, thereby freeing the sun gear for rotation. The shift lever 152 may then be swung upwardly about the pin 153 as a center, causing the lip 155 on this lever, bearing on the bracket 151 as a center, to shift the shaft 150 upwardly, after which the shift lever is swung in an arc while in its raised position and about the axis of the shaft 150 as a center. Upward shift of the shaft 150 acting through the collar 156 and its connections, shifts the lever 162 to the right in Fig. 10, against the action of the spring 164, disengaging lever 162 from the collar 167 on the rail 88 and engaging it with the collar 147 fixed on the rail 146, and rotation of the shaft 150 in the appropriate direction, while the lever 162 is engaged with the collar 147, causes the fork 145 connected to said collar to shift the clutch member 142 toward the left from its neutral position shown in Fig. 1, thereby causing it to bridge or simultaneously engage the clutch teeth on the sleeve 114 and the clutch teeth on the clutch member 140, a driving connection being thus established between the sleeve 114 which is splined on the rotor shaft 11 and the sleeve 114 to which the sun gear 115 is fixed.

During the setting of the transmission for reverse drive, the torque through the rotor is interrupted by the master pedal 98 which is held depressed during this operation, and upon completion thereof, this pedal may be released so that it may return to normal position under the action of its spring 98°, thereby causing the plunger 255 to lock the transmission in reverse setting, and torque is applied, by depressing the accelerator pedal to increase the speed of the engine sufficiently to cause the starting governor weights 74 to partially close the ports 36 by the valve sleeves 45 and thereby develop transmission of torque through the rotor. The torque is then transmitted from the rotor shaft 11 to shaft 110 and clutch member 140 fixed thereon, and is transferred through clutch member 142 to shaft 114 and the sun gear 115 fixed thereon, and the rotation of the gun gear drives the planetary pinions 119 which, in turn, and rotating on their stationary axes, drive the internal gear 120 fixed to the driven shaft in a reverse direction and at a relatively lower speed than that of the rotor shaft.

Restoring of the transmission setting to neutral, as shown in Fig. 1, may be effected immediately by depressing the master pedal 98, thus retracting the plunger 255 and unlocking the shaft 162, reversing the swing of the shift lever 152 while held in its raised position, thereby shifting the clutch member 142 out of engagement with the clutch member 140, and lowering the shift lever to its normal level as shown in Fig. 10, thereby transferring the lever 162 from the collar 147 to the collar 167 on the rail 88, thus restoring the transmission to its neutral condition as shown in Fig. 1. While the transmission is in neutral condition, the valve sleeves 45 are in fully retracted position, and uncover and open the ports 32a, as shown in Fig. 1, thereby permitting escape to the interior of the rotor of any oil that might seep into the cylinder 24.

The present invention provides a power transmission especially adapted for use on automotive vehicles, which may be operated automatically, semi-automatically or manually. The automatic operation is effected by the starting governor which is responsive to the speed of rotation of the engine or driving shaft, and the master governor which is responsive to the speed of the automobile or the speed of rotation of the rotor shaft, these governors operating the control valves of the rotor. The semi-automatic operations can be obtained in conjunction with the accelerator pedal, governor setting means, and the remote hand control assembly.

The manual control means can be operated either in conjunction with the automatic or semi-automatic control means, or may be operated independently thereof, as by manipulating the knob and it enables the operator, at will, to over-ride the automatic control means to either limit or restrict its operation, or to render the automatic control means entirely ineffective.

The rotor control valves enable the torque transmitted through the rotor to be varied between zero and maximum, according to the different positions in which these valves may be placed. The starting governor, which is responsive to the speed of the engine or driving shaft, automatically closes these valves to an extent sufficient to set the rotor into rotation, and as the speed of the automobile or driven mechanism increases, the master governor which is responsive to the speed thereof automatically completes closure of these valves, thereby establishing a full hydraulic lock. If an increased torque is desired, such may be obtained at the will of the operator by manually partially opening these valves, thereby enabling the engine to increase its speed and power. It is particularly advantageous, in the operation of an automobile, to effect this control from the usual accelerator pedal, as by depressing this pedal forwardly beyond its fully open throttle position so that the full power of the engine will be developed, thus enabling the automobile to accelerate its speed, and to increase its hill climbing ability beyond the capacity of the engine while running at the same speed as that of the rotor, the increased torque developed by the resulting increase in the speed of the engine being comparable with the shifting of the conventional shiftable gear transmission of an automobile to a lower speed.

The setting means for the transmission enables it to be set, by operation of a single lever or control member, for direct drive, and such setting of the transmission coincidentally sets the transmission in condition for overdrive. The shift from direct to overdrive may be made at the will of the operator while the automobile is traveling at a suitable speed, by merely rocking the accelerator pedal rearwardly beyond its fully closed throttle position and then returning said pedal to a suitable open throttle position. During the shift from direct to overdrive, the torque through the rotor is interrupted for a moment of sufficient duration to enable the driving clutch member to be disengaged from the direct driving clutch member and to be engaged with the overdrive clutch member. Shift back from overdrive to direct drive may be accomplished whenever desired by the operator by depressing the accelerator pedal forwardly beyond its fully open throttle position, the means for holding the transmission in overdrive being thereby released, and operating automatically to restore the transmission to direct drive.

The manual control means enables the operator to over-ride the automatic control at any time to either restrict the automatic control or to eliminate such control entirely. Whenever the master control pedal is employed, it provides means for quickly interrupting the torque through the transmission, and it may be employed to particular advantage in setting the transmission for stopping of the automobile, as it not only interrupts the torque but it unlocks the transmission setting means so that the transmission may be set for neutral, direct or reverse, and when fully depressed, brings the brake into action to stop spinning of the rotor and the clutch members, thereby facilitating engagement of the latter, as may be desired.

By providing means for utilizing power developed by the rotor for effecting the shift from direct to overdrive, this operation is greatly facilitated. The reversion pumps provided for this purpose are particularly advantageous as they are brought into operation automatically, when the accelerator pedal is rocked rearwardly toward closed throttle position, by the reverse direction of the torque transmitted through the rotor, thus utilizing this reverse torque to develop the hydraulic power employed to effect the shift. These reversion pumps also prevent so-called "free-wheeling" of the automobile and thus provide engine-braking when the power flow through the transmission is reversed.

The novel gearing provided by the present invention is not only relatively simple in construction and reliable in operation, but it enables a single planetary gear set with a single ring gear to provide three different gear selections, namely, direct drive, overdrive and reverse.

Since the gearing provides means for connecting the driving and driven shafts for direct drive of the driven shaft and also for driving of the latter shaft at a speed ratio higher than direct drive, the automobile or other mechanism may be driven in either of two speed ranges, and the hydraulic torque transmitting unit and its controlling means enables the ratio of speed in one of the ranges to be varied infinitely from zero up to direct drive, and to be varied in the other range infinitely from zero up to a speed higher than direct drive, without requiring any change in the speed of the engine or driving shaft. Such a method of varying the speed is advantageous as it enables the engine driving the transmission to operate at a substantially constant speed or at the speed at which it operates most efficiently or develops the maximum power. It is to be understood, however, that the speed of the driven shaft or the automobile or other mechanism driven therefrom may also be varied by varying the speed of the driving shaft, as by varying the speed of the engine of an automobile in which the transmission is used, by operation of the usual accelerator pedal or other engine throttle controlling means.

I claim as my invention:

1. A power transmission mechanism comprising a driving element, a rotor carrying hydraulic means driven by the driving element for circulating a fluid and thereby transmitting torque from the driving means to the rotor, means controlling the circulation of the fluid, means responsive to the speed of rotation of the driving element for operating said controlling means and having means for discontinuing its action on said controlling means to only partially obstruct said circulation of fluid, and means responsive to the speed of rotation of the rotor for operating said controlling means to further obstruct said circulation of fluid.

2. A power transmission mechanism comprising driving and driven elements, a rotor having means for connecting it to the driven element and carrying hydraulic means for circulating a fluid, means for driving said hydraulic means from the driving element, valves for controlling the circulation of fluid by said hydraulic means, means having a limited range of operation in response to the speed of rotation of the driving element for only partially closing said valves, and means operable independently of said second-mentioned means and responsive to the speed of rotation of the rotor for completing the closing of said valves.

3. A power transmission mechanism as defined in claim 2, including manually controlled means for rendering said second-mentioned speed responsive means inoperative with respect to said valves independently of said first-mentioned speed responsive means.

4. A power transmission mechanism as defined in claim 2, including a fuel control element for an engine for driving said driving element, and means operative by said fuel control element for controlling said second-mentioned speed responsive means.

5. A power transmission mechanism as defined in claim 2, including manually operable means for opening said valves independently of said first-mentioned speed responsive means.

6. A power transmission mechanism as defined in claim 2, including pedal operable means for rendering said second-mentioned speed responsive means inoperative with respect to said valves, and brake means operative by said pedal operable means for stopping rotation of said rotor.

7. A power transmission mechanism as defined in claim 2, including means for setting said second-mentioned speed responsive means in operative or inoperative relation with said valves, a remote manual control connected to said setting means and having means for holding it in different set positions, a pedal for operating said setting means, and a yieldable connection between said pedal and manual control to permit said pedal to over-ride said manual control.

8. A power transmission mechanism comprising driving and driven elements, a rotor carrying hydraulic means connected to the driving element to be driven thereby for circulating a fluid and for transmitting torque to the rotor, means for connecting the rotor to the driven element for direct drive and for overdrive thereof, valves controlling the circulation of the fluid by the hydraulic means and the transmission of torque to the rotor, means for operating said valves to momentarily interrupt said transmission of torque, and means responsive to reversal of torque between the driving element and rotor coincidently with the interruption of transmission of torque and reversal of circulation of the fluid for disconnecting the direct drive and establishing the overdrive between the rotor and the driven element.

9. A power transmission mechanism as defined in claim 8, including means for setting said rotor connecting means in a neutral condition during said interruption of transmission of torque.

10. A power transmission mechanism comprising driving and driven elements, a rotor carrying hydraulic fluid circulating means connected to the driving element to be driven thereby, for transmitting torque to the rotor overdrive gearing for driving the driven element at a speed greater than that of the rotor, means for connecting the rotor to the driven element for direct drive thereof or to the overdrive gearing, means controlling the circulating of fluid by said hydraulic means and thereby varying the torque transmitted to the rotor, means for operating said controlling means to cause free circulation of said fluid and thereby interrupt the transmission of torque, means controlled by said fluid circulation controlling means and actuated by said fluid for operating said connecting means to disconnect the rotor from the driven element and to connect the rotor to the overdrive gearing.

11. A power transmission mechanism as defined in claim 10, including means for storing power while said connecting means operates to connect the rotor to said overdrive gearing, and means for releasing said stored power for operation of said connecting means to disconnect the rotor from said overdrive gearing and to connect the rotor to the driven element for direct drive thereof.

12. A power transmission mechanism as defined in claim 10, including means operable while said transmission of torque is interrupted for setting said connecting means in neutral disconnected relation with the driven element and said overdrive gearing.

13. A power transmission mechanism comprising driving and driven elements, a rotor carrying hydraulic fluid circulating means, connected to the driving element to be driven thereby to transmit torque through the rotor, overdrive gearing for driving the driven element at a speed greater than that of the driving element, means for connecting the rotor to the driven element or to the overdrive gearing, fluid pressure operable means for operating said connecting means to effect one of said connecting operations, means controlling the circulation of fluid by said hydraulic means, and means for operating said fluid circulation controlling means to interrupt the transmission of torque through the rotor and to admit fluid under pressure to said fluid pressure operable means to actuate said connecting means.

14. A power transmission mechanism as defined in claim 13, wherein said fluid pressure operable means is operated by fluid pressure developed by torque applied to the rotor, and disconnects the rotor from the driven element and connects the rotor to said overdrive gearing.

15. A power transmission mechanism comprising driving and driven elements, a rotor carrying hydraulic means connected to the driving element for circulating a torque transmitting fluid by torque applied to the rotor by the driving element and carrying reversion hydraulic means for developing fluid pressure by counter torque applied to the rotor by the driven element, overdrive gearing for driving the driven element from the rotor at a speed greater than that of the rotor, means operable to connect the rotor to the driven element or to the overdrive gearing, fluid pressure operable means for operating said connecting means, and valve means operable to admit to said fluid pressure operable means fluid under pressure developed by said reversion hydraulic means under the influence of said counter torque to operate said connecting means to disconnect the rotor from the driven element and to connect it to said overdrive gearing.

16. A power transmission mechanism as defined in claim 15, wherein said valve means comprises a pair of valve members controlling respectively circulation of said torque transmitting fluid and the fluid pressure developed by said counter torque, and including means for opening the valve member controlling said fluid pressure to admit the latter to said fluid pressure operable means to operate said connecting means while holding other of said valve members in closed position for development of torque transmission by said circulating fluid.

17. A power transmission mechanism as defined in claim 15, including the throttle controlling element for an engine for driving the driving element, and means controlled by said throttle controlling element for operating said valve means.

18. A power transmission mechanism as defined in claim 15, including the throttle controlling element for an engine for driving the driving element, and means operable by said throttle controlling element when moved beyond its closed throttle position for operating said valve means to admit to said fluid pressure operable means fluid under pressure developed by said counter torque produced by the closed throttle condition of the engine.

19. A power transmission mechanism comprising driving and driven shafts, a rotor, direct and overdrive means connected to the driven shaft, means for connecting the rotor to the direct or overdrive means, pumps carried by the rotor and connected to the driving shaft for developing fluid pressure to transmit torque between said shafts, fluid pressure operable means for operating said connecting means, and valve means operable to admit said fluid pressure to said fluid pressure operable means.

20. A power transmission mechanism comprising driving and driven shafts, a rotor carrying pumps connected to the driving shaft for developing fluid pressure by relative rotation between the rotor and the driving shaft, means operable to connect the rotor directly or indirectly to the driven shaft, fluid pressure operable means for operating said connecting means, and valve means operable to admit to said fluid pressure operable means fluid pressure developed by said pumps.

21. A power transmission mechanism comprising driving and driven shafts, a rotor carrying pumps connected to the driving shaft to be driven thereby to circulate fluid for transmission of torque in one direction through the rotor and carrying pumps connected to the driving shaft to be driven by counter torque applied to the rotor by the driven shaft for developing fluid pressure, means for connecting the rotor and driven shaft for rotation at relatively different speed ratios fluid pressure operable means for operating said connecting means, and valve means operable to admit to said fluid pressure operable means fluid pressure developed by said counter torque.

22. A power transmission mechanism comprising driving and driven shafts, a rotor carrying pumps connected to the driving shaft to be driven thereby to circulate a fluid for transmission of torque from the driving shaft to the rotor, overdrive gearing connected to the driven shaft for driving the latter from the rotor at a relatively higher speed, means for connecting the rotor to the driven shaft directly or to the overdrive gearing, fluid pressure means for operating said connecting means, valve means controlling the circulation of fluid by the pumps and controlling said fluid pressure means, means for holding the overdrive gearing in condition for operation, and means for releasing said holding means and setting the valve means to interrupt transmission of torque from the driving shaft to the rotor for operation of said connecting means to connect the rotor directly to the driven shaft.

23. A power transmission mechanism as defined in claim 22, including the throttle controlling element of an engine for driving the driving shaft, and means operable by said element when moved beyond fully open throttle position for operating said releasing means.

24. A power transmission mechanism comprising driving and driven shafts, a rotor carrying a pump driven by the driving shaft for circulating fluid for torque transmission by the rotor and also carrying a pump connected to the driving shaft for developing fluid pressure by counter torque applied to the rotor by the driven shaft, overdrive gearing for driving the driven shaft from the rotor at a relatively higher speed than that of the rotor, means for connecting the rotor to the driven shaft directly or to the overdrive gearing, a fluid pressure operable motor for operating said connecting means, a valve member controlling said circulating fluid, a valve member controlling said developed fluid pressure, means responsive to the speed of the rotor for holding closed the valve member controlling the circulating fluid, and means operable at will to operate the valve member controlling the developed fluid pressure to admit such fluid pressure to the motor to operate said connecting means.

25. A power transmission mechanism as defined in claim 24, including means yieldably connecting said valve member controlling said circulation of fluid and said valve member controlling said fluid pressure for operation independently or conjointly, means operative by said speed responsive means for operating said valve members conjointly or for holding from operation the valve member controlling said circulation of fluid, and manually controlled means for operating alone the valve member controlling said fluid pressure.

26. A power transmission mechanism as defined in claim 24, including manually operable means for rendering said speed responsive means inoperative with respect to said valve member controlling the circulating fluid to permit opening thereof.

27. A power transmission mechanism for an engine having a fuel control element, comprising driving and driven shafts, a rotor carrying hydraulic means connected to the driving shaft for circulating fluid to transmit torque to the rotor, means including overdrive gearing connected to the driven shaft for driving the latter from the rotor at a higher speed than that of the driving shaft, means including a clutch member shiftable in one or another direction to connect the driving shaft to the driven shaft for direct drive or to the overdrive gearing, means operative by the shifting movement of the clutch member in one direction to store power for effecting shifting movement of the clutch member in the other direction, and means for holding the clutch member against movement under the action of the power storing means and having means for operating it by said fuel control element to release said clutch member.

28. A power transmission mechanism comprising driving and driven shafts, a rotor carrying hydraulic means connected to the driving shaft for circulating fluid to transmit torque through the rotor, valve means controlling said circulation of fluid, a governor responsive to speed of rotation of the rotor for closing the valve means for transmission of torque through the rotor, overdrive gearing connected to the driven shaft for driving the latter at a speed greater than that of the rotor, means including a clutch member shiftable in one or another direction to connect the rotor to the driven shaft directly or to the overdrive gearing, means operative by movement of the clutch member in the direction to connect the rotor to the overdrive gear to store power to effect shift of said clutch member in the other direction to connect the rotor to the driven shaft directly, means for holding the clutch member against movement under the action of said power storing means, means for releasing said holding means, and means operative by said releasing means for rendering the governor inoperative upon the valve means and thereby permit the latter to open and to interrupt transmission of torque through the rotor.

29. In a power transmission mechanism, driving and driven shafts, hydraulic torque transmitting means between the driving and driven shafts for driving the latter shaft at infinitely varying speed ratios, planetary gearing comprising a sun gear, planetary pinions cooperative with and having a carrier rotatable relatively to the sun gear, and a gear connected to the driven shaft and meshing with said pinions, valve means for varying the transmission of torque between the driving shaft and the torque transmitting means, clutch means for connecting the torque transmitting means to the driven shaft or to the planetary pinion carrier, means for locking the valve means in condition for transmission of full torque, means for locking the sun gear for transmission of power to the driven shaft through the planetary pinion carrier, and means for coupling the sun gear to the torque transmitting means for transmission of power to the driven shaft in reverse direction through the planetary gearing.

30. In a power transmission mechanism, means for providing two forward speeds and reverse comprising driving and driven shafts, infinitely variable speed torque transmitting means between the driving and driven shafts, a sun gear mounted rotatably relatively to the torque transmitting means, an internal gear fixed to the driven shaft, pinions meshing with said gears, a carrier in which said pinions are mounted rotatably, driving clutch members connected to the pinion carrier and driven shaft respectively, a controlling clutch member connected to the torque transmitting means and engageable with one or the other of said driving clutch members, brake members having thereon a pair of closely adjacent annular rows of teeth connected to the sun gear and pinion carrier respectively, an anchoring brake member having thereon a pair of axially spaced annular rows of teeth and shiftable into engagement with the teeth on the brake member connected to the sun gear for holding the latter from rotation while said controlling clutch member is engaged with the driving clutch member connected to the pinion carrier, for driving the driven shaft at a speed greater than that of the driving shaft, coupling clutch members having closely adjacent annular rows of teeth thereon and connected to the torque transmitting means and sun gear respectively, and an internally toothed clutch member shiftable into a position to connect the coupling clutch members while the anchoring brake member is engaged with the teeth on the brake member connected to the pinion carrier and said controlling clutch member is engaged with the driving clutch member connected to the driven shaft, for driving the driven shaft in a reverse direction to that of the driving shaft.

31. A power transmission for an engine having a fuel control element, mechanism comprising driving and driven elements, planetary gearing including a sun gear mounted rotatably relatively to the driving element, a gear connected to the driven element, pinions cooperating with said gears, and a carrier in which the pinions are mounted rotatably, means for connecting the driving element directly to the driven element or to the pinion carrier, means for holding the sun gear or the pinion carrier from rotation, means operable manually for setting said holding means to hold the sun gear from rotating, means for storing power by said setting of the holding means, manually controlled means for operating said connecting means to connect the driving element to the pinion carrier, means actuated by the fuel control element of the engine for releasing said power storing means, and means operable by said power storing means when released to operate said connecting means to connect the driving element directly to the driven element.

32. A power transmission mechanism according to claim 31 wherein said holding means comprises a brake member shiftable axially of said planetary gearing into one or another position to lock the sun gear or the pinion carrier from rotation, and said power storing means comprises a spring loaded by said setting of said holding means and acting on said connecting means to connect the driving element directly to the driven element.

33. A power transmission mechanism according to claim 31, wherein said holding means comprises a member shiftable into one or another position to hold the sun gear or pinion carrier from rotation, and said fuel control element comprises the throttle controlling element of an engine for driving the driving element, and including means operable by movement of said throttle controlling element beyond its fully open throttle position for releasing said power storing means.

34. A power transmission mechanism for an automobile having an accelerator pedal for controlling the engine throttle, comprising driving and driven shifts, planetary gearing including a sun gear mounted rotatably relatively to the driving shaft, a gear connected to the driven shaft, pinions meshing with said gears, and a carrier in which the pinions are mounted rotatably, a clutch for connecting the driving shaft to the driven shaft directly or to the planetary pinion carrier, a locking member shiftable into one or another position to hold the sun gear or the planetary pinion carrier from rotation, manually operable means for setting said member in one or the other of said positions, means operable by the setting of said member in position to hold the sun gear from rotation for storing power, means for restraining said power storing means, means operable by movement of the throttle controlling member beyond fully open throttle position for releasing said restraining means, and means operable by the power storing means for operating said clutch to connect the driving shaft directly to the driven shaft.

35. A power transmission mechanism according to claim 34 wherein said restraining means comprises a cam connected to said power storing means, a spring acting on said cam, a second cam operable by said releasing means to load said spring sufficiently to restrain said power storing means, and means for operating said second cam in response to operation of said releasing means to reduce the load on said spring and thereby permit operation of said power storing means.

36. A power transmission mechanism according to claim 34, including a pedal for operating said releasing means, and means controlled by said pedal for locking said setting means.

37. A power transmission mechanism for an automobile having an element for controlling the throttle of the engine thereof, comprising a driving element adapted to be driven by the engine of the automobile, a driven element, hydraulic torque transmitting means connected to the driving element to be driven thereby and having means for varying the transmission of torque therethrough at infinitely varying speed ratios, speed changing means between said hydraulic torque transmitting means and the driven element for driving the latter at a relatively low or high speed ratio relatively to the speed of said hydraulic torque transmitting means, means including a governor responsive to relatively low speed of the driving element for setting the torque varying means of the hydraulic torque transmitting means for transmission of relatively low torque to the torque transmitting means, and means including a second governor responsive to the speed of the driven element and having means for controlling it by movement of the engine throttle controlling element for setting the torque varying means for transmission of relatively high torque to said speed changing means to drive the driven element at a relatively high speed ratio.

38. A power transmission mechanism according to claim 37, including means actuated by said engine throttle controlling element for rendering said second governor ineffective, and means controlled by said engine throttle controlling element for setting said speed changing means to drive the driven element at a relatively lower speed ratio.

39. A hydraulic power transmission mechanism for a motor vehicle having an engine controlled by a throttle operable by an accelerator pedal, comprising driving and driven shafts, hydraulic torque transmitting means for transmitting torque between said shafts including a casing containing fluid and means driven by the driving shaft for circulating the fluid in the casing to transmit torque from the driving shaft to the driven shaft at infinitely varying speed ratios from zero speed to approximately the speed of rotation of the driving shaft, a gear set having means for connecting it to the torque transmitting means and to the driven shaft and means for providing a plurality of forward gear ranges, a reverse and a neutral condition, fluid pressure means operable to effect a gear range change in the gear set, the torque transmitting means being operable to infinitely vary the torque transmitted to the gear set in a selected gear range from zero speed to approximately the speed of rotation of the driving shaft, a reservoir containing fluid, means for circulating fluid from the reservoir to said hydraulic torque transmitting means and for returning fluid to said reservoir, and valve means operable to supply fluid to said fluid pressure means to effect a gear range change in the gear set and to place the transmission mechanism in a neutral condition, braking means for the driven shaft, and a controlling element operable manually to operate said valve means and thereby place the transmission mechanism in a neutral condition and subsequently to apply the braking means to the driven shaft to lock the driven shaft from rotation and thereby apply a braking action to the motor vehicle.

40. A hydraulic power transmission mechanism as defined in claim 39, wherein said gear set comprises a single planetary gear set in fixed axial position relatively to the driven shaft and having a single ring gear and gearing and brake means cooperative therewith to provide the plurality of forward gear ranges, a reverse and a neutral condition.

41. A hydraulic power transmission mechanism as defined in claim 39, wherein said driving shaft is the engine shaft, and including means incorporated in said hydraulic torque transmitting means and operable to directly connect said driving shaft to said driven shaft for opposing rotation of the driven shaft in response to reversal of power flow through the transmission mechanism.

42. A hydraulic power transmission mechanism as defined in claim 39, wherein said valve means is controlled by the accelerator pedal to vary the torque transmitted by said torque transmitting means to reduce the load on the engine and thereby cause increase in speed of the driving shaft above the speed of the driven shaft while said gear set is set for any of the gear ranges.

43. A hydraulic power transmission mechanism as defined in claim 39, including braking means for the driven shaft, and a controlling element operable manually to place the transmission mechanism in a neutral condition and subsequently to apply the braking means to the driven shaft to resist or lock the driven shaft from rotation.

44. A hydraulic power transmission mechanism as defined in claim 39, including means for interrupting the driving torque through the gear set prior to a gear range selection, and for re-establishing said driving torque when the gear range selection has been completed.

45. A hydraulic power transmission mechanism for a motor vehicle having an engine controlled by a throttle operable by an accelerator pedal, comprising driving and driven shafts, a hydraulic torque transmitting means for transmission of torque between said shafts and comprising a casing containing fluid and means driven by the driving shaft for circulating the fluid in the casing to transmit torque from the driving shaft to the driven shaft at infinitely variable speed ratios from zero speed to approximately the speed of the driving shaft, a gear set between said torque transmitting means and the driven shaft having means providing a plurality of forward gear ranges, a reverse and neutral, manual means operable to select a forward or reverse change in the gear set, and means responsive to the speed of the driven shaft and conditioned by said manual selecting means for selecting different forward gear ranges automatically, said manual selecting means being also operable independently of the automatic selecting means to select a forward or reverse change in the gear set or to place the gear set in neutral, fluid pressure means operable to effect a gear range change in the gear set, the torque transmitting means being normally operable to transmit torque to the gear set in a selected gear range from zero to approximately the speed of rotation of the driving shaft, a reservoir containing fluid, means for conducting fluid from the reservoir to said hydraulic torque transmitting means and for returning fluid to said reservoir, valve means operable to supply fluid to said fluid pressure means to effect a gear range change in the gear set, controlling means for said valve means, and means responsive to the speed of rotation of the driven shaft in conjunction with the throttle operating movement of the accelerator pedal for rendering operative said valve controlling means, said valve means being also operable by movement of the accelerator pedal beyond the full open throttle position to effect a gear range change in the transmission mechanism.

46. A hydraulic power transmission mechanism as defined in claim 45, wherein said gear set is in a fixed axial position relatively to said driven shaft and comprises a single planetary gear set having a single ring gear and gearing and brake means cooperative therewith to provide the plurality of forward gear ranges, a reverse and neutral.

47. A hydraulic power transmission mechanism as defined in claim 45, wherein said driving shaft is the engine shaft, and including means incorporated in the transmission mechanism and operable to directly connect said driving shaft to said driven shaft for resisting rotation of the driven shaft in response to reversal of power flow through the transmission.

48. A hydraulic power transmission mechanism as defined in claim 45, wherein said driving shaft is the engine shaft, and including means incorporated in said hydraulic torque transmitting means and operable to directly connect said driving shaft to said driven shaft for opposing rotation of the driven shaft in response to reversal of power flow through the transmission mechanism.

49. A hydraulic power transmission mechanism as defined in claim 45, wherein said valve means is rendered operative by movement of the accelerator pedal beyond full open throttle position to effect a gear range change in said gear set from a higher to a lower gear range, and means responsive to speed of the driven shaft and operable to return the gear set to a higher gear range.

50. A hydraulic power transmission mechanism as defined in claim 45, including means operable manually at will to directly effect mechanically a gear ratio change or to place the transmission mechanism in neutral condition.

51. A hydraulic power transmission mechanism as defined in claim 45, including braking means for the driven shaft, and a controlling element operable manually to place the transmission mechanism in neutral condition and subsequently to apply the braking means to the driven shaft to hold it from rotation and thereby apply a braking action to the motor vehicle.

52. A hydraulic power transmission mechanism as defined in claim 45, including means for interrupting the driving torque prior to a gear range selection and for re-establishing the driving torque after the gear range selection has been completed.

53. A hydraulic power transmission mechanism as defined in claim 45, wherein said valve means controls said fluid pressure means to connect the driving and driven shafts for direct drive and coincidentally to stop circulation of the torque transmitting fluid in the hydraulic torque transmitting means.

54. A hydraulic power transmission mechanism as defined in claim 45, wherein said gear set includes means to connect the driving and driven shafts for rotation of the driven shaft at a higher speed than the driving shaft and said valve means is operative to coincidentally stop circulation of the torque transmitting fluid in the torque transmitting means.

55. A hydraulic power transmission mechanism as defined in claim 45, including means responsive to a predetermined accelerating speed of the driven shaft to operate the valve means controlling said fluid pressure means to establish a direct drive connection between said shafts and coincidentally to stop circulation of the torque transmitting fluid in the torque transmitting means, and subsequently responsive to a predetermined decelerating speed of the driven shaft to disconnect such direct drive connection and again start circulation of the torque transmitting fluid in the hydraulic torque transmitting means to connect the driving and driven shafts.

56. A hydraulic power transmission mechanism as defined in claim 45, wherein said valve means controls said fluid pressure means to connect said driving and driven shafts for a direct drive, and is rendered operative by movement of the accelerator pedal beyond full open throttle position to disconnect the direct drive relation between the driving and driven shafts and connect the driven shaft through the circulation of fluid in the hydraulic torque transmitting means to the driving shaft.

57. A hydraulic power transmission mechanism as defined in claim 45, wherein said valve means is rendered operative by the accelerator pedal to reduce the load on the engine and thereby increase the speed of rotation of the driving shaft above the speed of rotation of the driven shaft while said gear set is set for any of its gear ranges.

58. A hydraulic power transmission mechanism for a motor vehicle having an engine controlled by a throttle operable by an accelerator pedal, comprising driving and driven shafts, clutch means for connecting said shafts, a hydraulic torque transmitting means for transmission of torque between said shafts and comprising a casing containing fluid and means driven by the driving shaft for circulating the fluid in the casing to provide a fluid connection between said shafts and thereby transmit torque from the driving shaft to the driven shaft at infinitely variable speed ratios from zero speed to approximately the speed of the driving shaft, fluid pressure means and controlling valve means for rendering said clutch means operable to establish the direct driving connection or to establish the circulating fluid connection between the driving and driven shafts, and controlling means for said valve means responsive to movement of the accelerator pedal and to a predetermined accelerating speed of the driven shaft to establish the direct driving connection between the driving and driven shafts and responsive to a predetermined decelerating speed of the driven shaft to establish the circulating fluid connection between the driving and driven shafts.

59. A hydraulic power transmission mechanism as defined in claim 58, including means rendered operative by movement of the accelerator pedal beyond open throttle position to disconnect the direct driving connection between the driving and driven shafts and establish a circulating fluid connection between said shafts.

60. A hydraulic power transmission mechanism as defined in claim 58, wherein said valve means is rendered operative by movement of the accelerator pedal beyond open throttle position to condition said hydraulic torque transmitting means to establish the circulating fluid connection between said shafts, and wherein said valve means is responsive to speed of the driven shaft to condition said hydraulic torque transmitting means to reestablish the direct drive between said shafts.

61. A hydraulic power transmission mechanism as defined in claim 58, wherein said valve means is rendered operable by movement of the accelerator pedal in a throttle closing direction to disconnect the driving and driven shafts.

EDWARD J. THURBER.

REFERENCES CITED

The following references are of record in the file of this patent:

UNITED STATES PATENTS

| Number | Name | Date |
|---|---|---|
| 1,457,526 | Jackson | June 5, 1923 |
| 1,584,188 | Moorhouse | May 11, 1926 |
| 1,754,953 | Igou | Apr. 15, 1930 |
| 1,903,714 | Frias | Apr. 11, 1933 |
| 1,953,551 | Bullock | Apr. 3, 1934 |
| 1,990,212 | Tonich | Feb. 5, 1935 |
| 2,014,944 | Martyrer et al. | Sept. 17, 1935 |
| 2,067,793 | Seibold | Jan. 12, 1937 |
| 2,103,540 | Livermore | Dec. 28, 1937 |
| 2,174,672 | Von Sodan-Frauenhofen | Oct. 3, 1939 |
| 2,198,891 | Thoma | Apr. 30, 1940 |
| 2,238,746 | Neracher | Apr. 15, 1941 |
| 2,242,112 | Chester | May 13, 1941 |
| 2,248,492 | Cotterman | July 8, 1941 |
| 2,278,351 | Havens et al. | Mar. 31, 1942 |
| 2,311,209 | Carnagua | Feb. 16, 1943 |
| 2,329,724 | Maurer | Sept. 21, 1943 |
| 2,332,593 | Nutt et al. | Oct. 26, 1943 |
| 2,348,424 | Shorter | May 9, 1944 |
| 2,372,817 | Dodge | Apr. 3, 1945 |
| 2,404,623 | Dodge | July 23, 1946 |
| 2,408,951 | Pollard | Oct. 8, 1946 |